(12) United States Patent
Mishra et al.

(10) Patent No.: US 11,356,314 B2
(45) Date of Patent: Jun. 7, 2022

(54) PULSE AMPLITUDE MODULATION (PAM) ENCODING FOR A COMMUNICATION BUS

(71) Applicant: QUALCOMM Incorporated, San Diego, CA (US)

(72) Inventors: Lalan Jee Mishra, San Diego, CA (US); Richard Dominic Wietfeldt, San Diego, CA (US); George Alan Wiley, San Diego, CA (US); Radu Pitigoi-Aron, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/076,190

(22) Filed: Oct. 21, 2020

(65) Prior Publication Data

US 2022/0123987 A1   Apr. 21, 2022

(51) Int. Cl.
*H04L 5/12* (2006.01)
*H04L 23/02* (2006.01)
*H04L 27/36* (2006.01)
*H04L 25/49* (2006.01)
*H04L 1/00* (2006.01)

(52) U.S. Cl.
CPC .......... *H04L 27/363* (2013.01); *H04L 1/0063* (2013.01); *H04L 25/4917* (2013.01)

(58) Field of Classification Search
CPC .. H04L 27/363; H04L 1/0063; H04L 25/4917
USPC .......................................................... 375/262
See application file for complete search history.

(56) References Cited

U.S. PATENT DOCUMENTS

| 7,050,517 B1* | 5/2006 | Sallaway ................ H04B 3/23 |
| | | 375/350 |
| 2005/0111490 A1 | 5/2005 | Gillet |
| 2017/0255578 A1 | 9/2017 | Ngo et al. |
| 2019/0238362 A1* | 8/2019 | Mishra ............... G06F 13/4291 |
| 2020/0097434 A1 | 3/2020 | Mishra et al. |
| 2021/0006439 A1* | 1/2021 | Li ..................... H04B 10/6971 |

OTHER PUBLICATIONS

International Search Report and Written Opinion for International Patent Application No. PCT/US2021/049906, dated Jan. 4, 2022, 13 pages.

* cited by examiner

*Primary Examiner* — Tanmay K Shah
(74) *Attorney, Agent, or Firm* — Qualcomm Incorporated

(57) ABSTRACT

Pulse amplitude modulation (PAM) encoding for a communication bus is disclosed. In particular, various two-wire communication buses may encode bits using three-level PAM (PAM-3) or five-level PAM (PAM-5) to increase bit transmission without requiring increases to clock frequencies or adding additional pins. Avoiding increases in clock frequencies helps reduce the risk of electromagnetic interference (EMI), and avoiding use of extra pins avoids cost increases for integrated circuits (ICs).

22 Claims, 17 Drawing Sheets

PULSE AMPLITUDE MODULATION (PAM) ENCODING FOR A COMMUNICATION BUS

BACKGROUND

I. Field of the Disclosure

The technology of the disclosure relates generally to increasing bandwidth on a communication bus by providing pulse amplitude modulation (PAM).

II. Background

Computing devices abound in modern society. Such computing devices rely on myriad integrated circuits (IC) to provide different functions. The abundance of ICs necessitates communication therebetween. Several protocols have been developed to provide guidance on how different ICs may communicate. Increasing amounts of data are being transferred between ICs necessitating ever increasing bandwidths. Traditional techniques for increasing bandwidth such as adding a pin to add a data lane or increasing a bus frequency are becoming less well suited as IC size shrinks.

SUMMARY OF THE DISCLOSURE

Aspects disclosed in the detailed description include pulse amplitude modulation (PAM) encoding for a communication bus. In particular, various two-wire communication buses may encode bits using three-level PAM (PAM-3) or five-level PAM (PAM-5) to increase bit transmission without requiring increases to clock frequencies or adding additional pins. Avoiding increases in clock frequencies helps reduce the risk of electromagnetic interference (EMI), and avoiding use of extra pins avoids cost increases for integrated circuits (ICs).

In this regard in one aspect, an integrated circuit (IC) is disclosed. The IC includes a bus interface coupled to a communication bus. The IC also includes a clock source coupled to the bus interface. The IC also includes a control circuit. The control circuit is configured to send a clock signal derived from the clock source and having a parity bit embedded therein over a clock line of the communication bus through the bus interface. The control circuit is also configured to send a PAM data signal over a data line of the communication bus.

In another aspect, an IC is disclosed. The IC includes a bus interface coupled to a communication bus. The IC also includes a control circuit. The control circuit is configured to receive a clock signal having a parity bit embedded therein over a clock line of the communication bus through the bus interface. The control circuit is also configured to receive a PAM data signal over a data line of the communication bus.

In another aspect, a computing system is disclosed. The computing system includes a communication bus. The computing system also includes a first IC. The first IC includes a first bus interface coupled to the communication bus. The first IC also includes a clock source coupled to the first bus interface. The first IC also includes a first control circuit. The first control circuit is configured to send a clock signal derived from the clock source and having a parity bit embedded therein over a clock line of the communication bus through the first bus interface. The first control circuit is also configured to send a PAM data signal over a data line of the communication bus. The computing system also includes a second IC. The second IC includes a second bus interface coupled to the communication bus. The second IC also includes a second control circuit. The second control circuit is configured to receive the clock signal having the parity bit embedded therein. The second control circuit is also configured to receive the PAM data signal.

DETAILED DESCRIPTION

Figure 1:
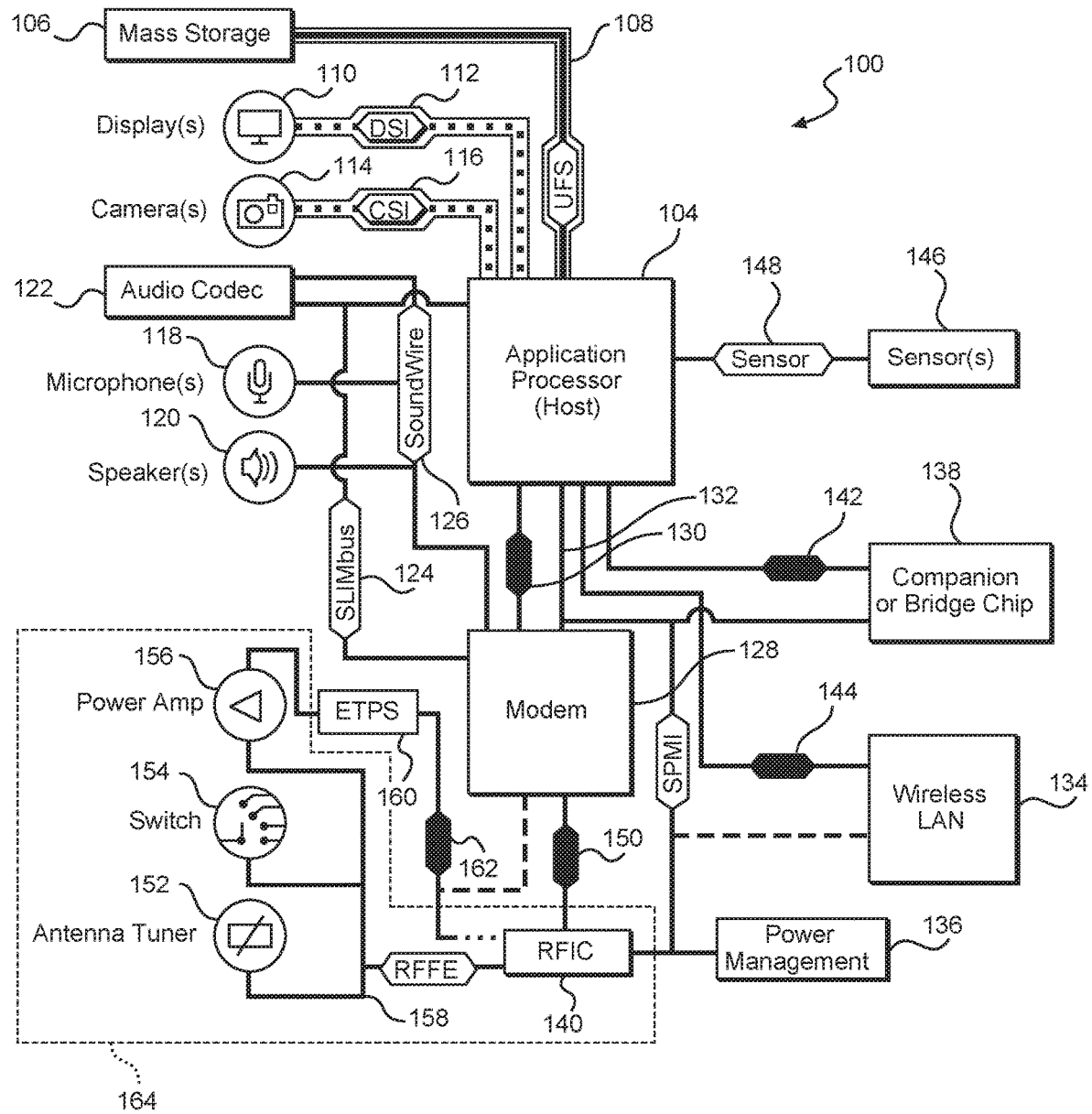
FIG. 1 is a block diagram of an exemplary mobile terminal having various internal communication buses interconnecting various integrated circuits (ICs)

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include pulse amplitude modulation (PAM) encoding for a communication bus. In particular, various two-wire communication buses may encode bits using three-level PAM (PAM-3) or five-level PAM (PAM-5) to increase bit transmission without requiring increases to clock frequencies or adding additional pins. Avoiding increases in clock frequencies helps reduce the risk of electromagnetic interference (EMI), and avoiding use of extra pins avoids cost increases for integrated circuits (ICs).

Before addressing particulars of using PAM encoding for a communication bus, a brief overview of a mobile terminal with various communication buses is provided with reference to FIG. 1. The details of a PAM encoding technique are provided beginning with reference to FIG. 2.

In this regard, FIG. 1 is a system-level block diagram of an exemplary mobile terminal 100 such as a smart phone, mobile computing device tablet, or the like that may include one or more communication buses which may use the PAM encoding techniques of the present disclosure. For example, the PAM encoding techniques of the present disclosure are well suited for use with a system power management interface (SPMI) bus, a radio frequency front end (RFFE) bus, an I3C bus, or the like.

With continued reference to FIG. 1, the mobile terminal 100 includes an application processor 104 (sometimes referred to as a host) that communicates with a mass storage element 106 through a universal flash storage (UFS) bus 108. The application processor 104 may further be connected to a display 110 through a display serial interface (DSI) bus 112 and a camera 114 through a camera serial interface (CSI) bus 116. Various audio elements such as a microphone 118, a speaker 120, and an audio codec 122 may be coupled to the application processor 104 through a serial low-power interchip multimedia bus (SLIMbus) 124. Additionally, the audio elements may communicate with each other through a SOUNDWIRE bus 126. A modem 128 may also be coupled to the SLIMbus 124 and/or the SOUND-WIRE bus 126. The modem 128 may further be connected to the application processor 104 through a peripheral component interconnect (PCI) or PCI express (PCIE) bus 130 and/or an SPMI bus 132. The SPMI bus 132 may be a two-wire bus including a clock line and a data line (not illustrated in FIG. 1). At its simplest, SPMI is a protocol to communicate between a host and a power management integrated circuit (e.g., PMIC 136 described below) to control voltage regulators from the host and communicate voltage increases and decreases back from the PMIC 136.

With continued reference to FIG. 1, the SPMI bus 132 may also be coupled to a local area network (LAN or WLAN) IC (LAN IC or WLAN IC) 134, a power management integrated circuit (PMIC) 136, a companion IC (sometimes referred to as a bridge chip) 138, and a radio frequency IC (RFIC) 140. In exemplary aspects, one or more of these ICs may be masters or slaves. More detail on masters and slaves within an SPMI system are provided below with reference to FIG. 2. It should be appreciated that separate PCI buses 142 and 144 may also couple the application processor 104 to the companion IC 138 and the WLAN IC 134. The application processor 104 may further be connected to sensors 146 through a sensor bus 148. The modem 128 and the RFIC 140 may communicate using a bus 150.

With continued reference to FIG. 1, the RFIC 140 may couple to one or more RFFE elements, such as an antenna tuner 152, a switch 154, and a power amplifier 156 through a RFFE bus 158. Additionally, the RFIC 140 may couple to an envelope tracking power supply (ETPS) 160 through a bus 162, and the ETPS 160 may communicate with the power amplifier 156. Collectively, the RFFE elements, including the RFIC 140, may be considered an RFFE system 164. It should be appreciated that the RFFE bus 158 may be formed from a clock line and a data line (not illustrated). While not illustrated, additional buses such as I2C or I3C may be present within the mobile terminal 100.

Exemplary aspects of the present disclosure are well suited for use on two-wire single-ended buses such as an SPMI bus, an RFFE bus, or an I3C bus, but the present disclosure is not so limited and the PAM encoding techniques may be used in differential buses as well. However, for the sake of illustration, the initial discussion will focus on a single-ended two-wire bus such as an SPMI bus. A discussion of a differential bus is provided below with reference to FIGS. 7B and 8B.

Figure 2B:
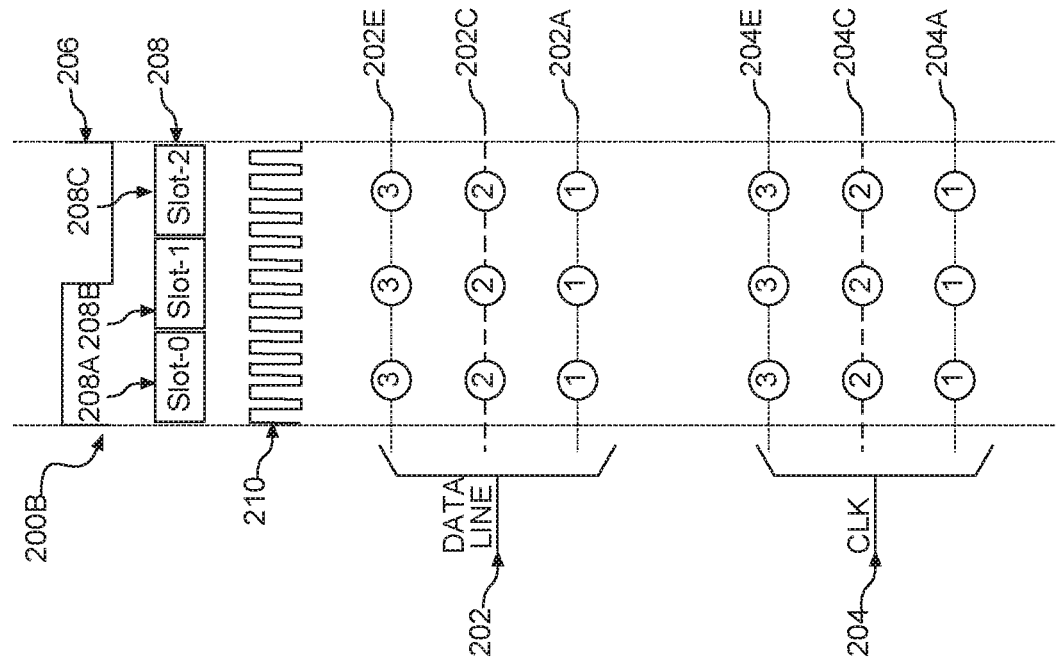
FIG. 2B illustrates waveforms for a three-level PAM (PAM-3) encoding scheme.
Figure 2A:
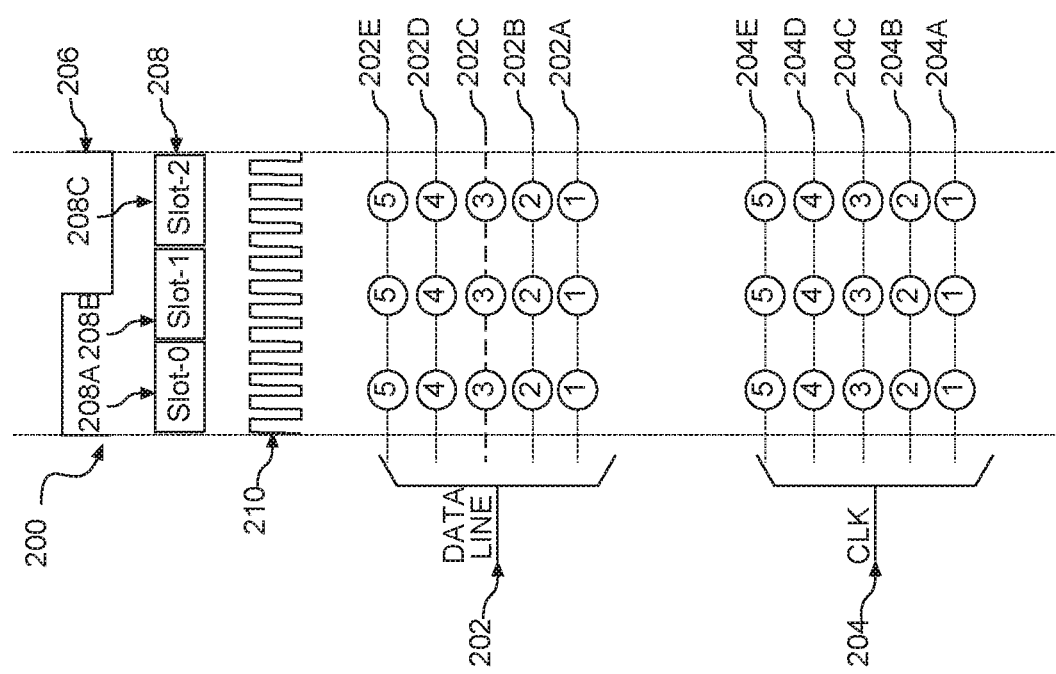
FIG. 2A illustrates waveforms for a five-level pulse amplitude modulation (PAM-5) encoding scheme.

FIG. 2A provides an overview of a PAM-5 encoding technique 200 including possible states for a data line 202 and possible states for a clock line 204. In particular, the clock line 204 may have a normal period 206 that is divided into three slots as shown in line 208. An internal clock signal 210 having a frequency twelve times faster (although six or even three times faster would also work) than the frequency of the normal period 206 may be used to help divide the normal period into the three slots 208A-208C. The voltage level for the data line 202 may be divided into five levels 202A-202E, where level 202A is zero volts (0 V) and level 202E is the maximum voltage level for the bus (e.g., Vdd). Levels 202B-202D are 25%, 50%, and 75% of Vdd, respectively. The data line 202 may be driven at any of the five levels 202A-202E in each of the slots 208A-208C, providing one hundred twenty-five (125 (i.e., 5*5*5)) possible states in a single normal period 206. Similarly, the voltage level for the clock line 204 may be divided into five levels 204A-204E where the clock line 204 may be driven at any of the five levels 204A-204E in each of the slots 208A-208C, providing an additional 125 possible states in a single normal period 206. Thus, a theoretical number of possible states would be 15,625 (i.e., 525*525).

While PAM-5 is a robust encoding technique, there may be situations where noise on the bus prevents discrimination between five different voltage levels. In such instances, a PAM-3 encoding technique 200B may be used as illustrated in FIG. 2B. In PAM-3 encoding, the voltage level for the data line 202 may be divided into just three levels 202A, 202C, and 202E while the clock line 204 may be divided into three levels 204A, 204C, and 204E. Using three voltage levels results in eighty-one (81) total possible states across the two lines 202, 204.

Figure 2C:
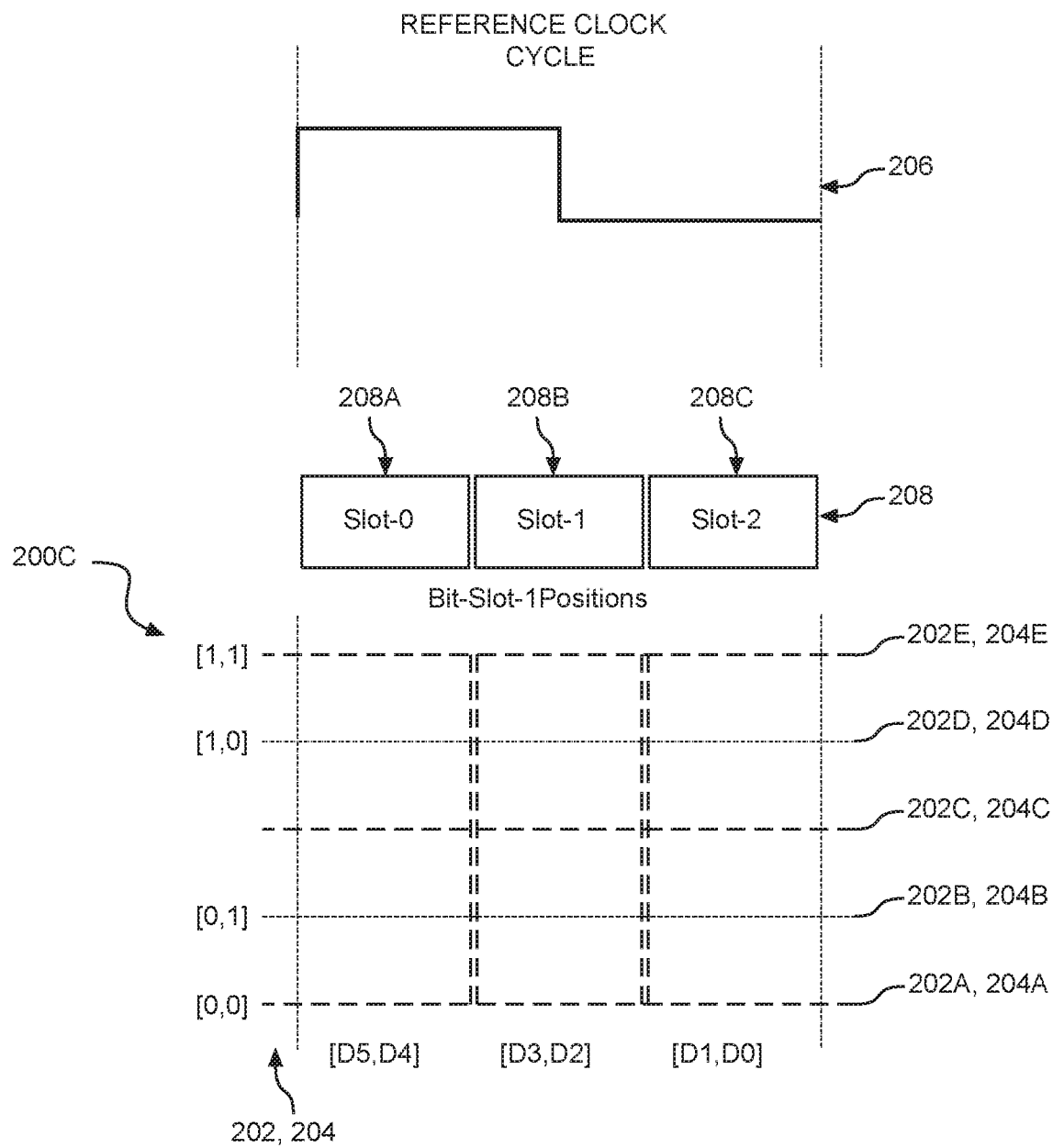
FIG. 2C illustrates data bits relative to a clock signal.

Assuming that PAM-5 is used, FIG. 2C illustrates an exemplary two-bit encoding scheme 200C that allows six bits to be sent over the data line 202 or clock line 204. Specifically, each slot 208A-208C holds two bits determined by the voltage level at that slot. Thus, for example, levels 202A, 204A correspond to [0,0]; levels 202B, 204B correspond to [0,1]; levels 202D, 204D correspond to [1,0]; and levels 202E, 204E correspond to [1,1]. Levels 202C, 204C correspond to an idle level and are not assigned specific bits.

Figure 3A:
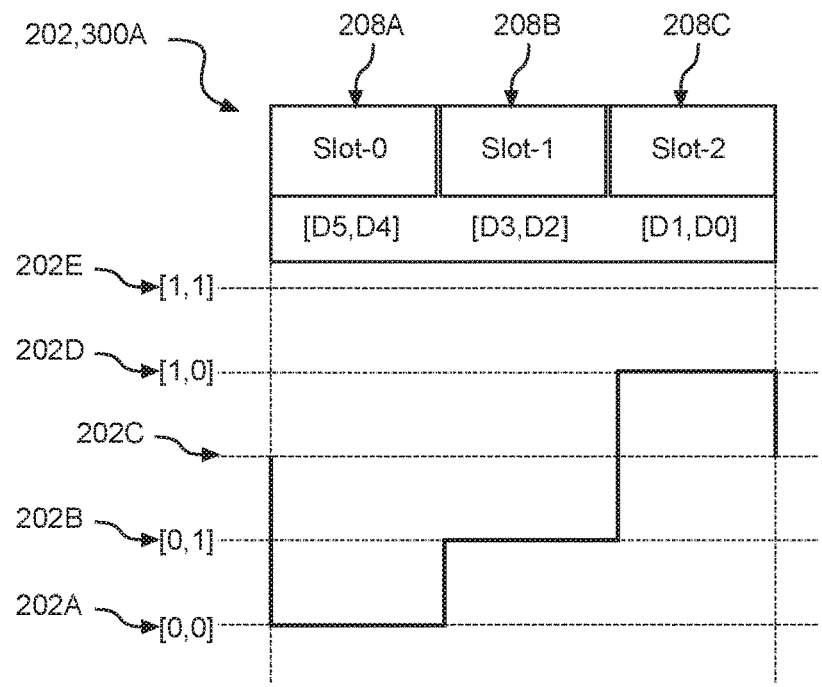
FIGS. 3A-3D illustrate four exemplary encoding possibilities using a PAM-5 encoding scheme on a data line.
Figure 3B:
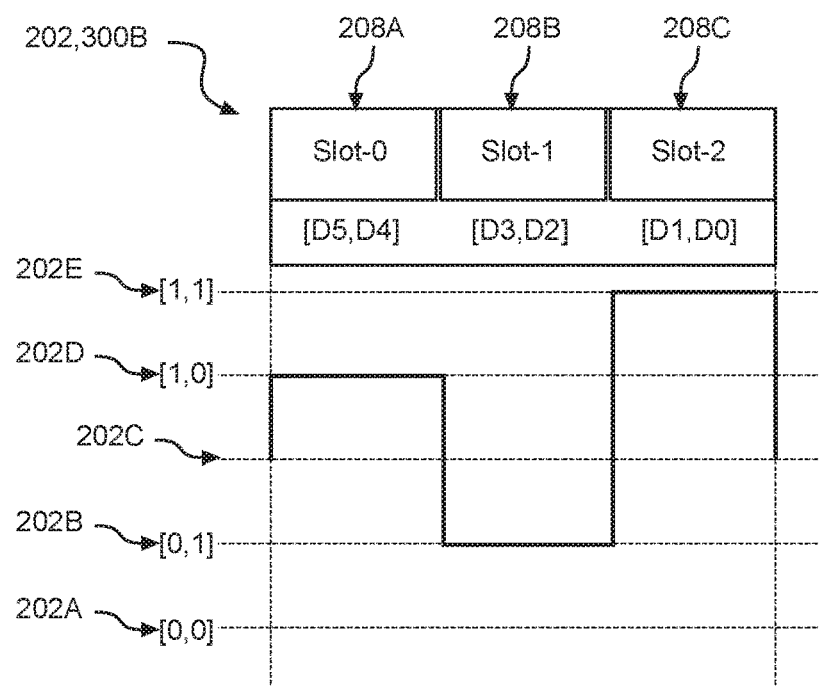
Figure 3C:
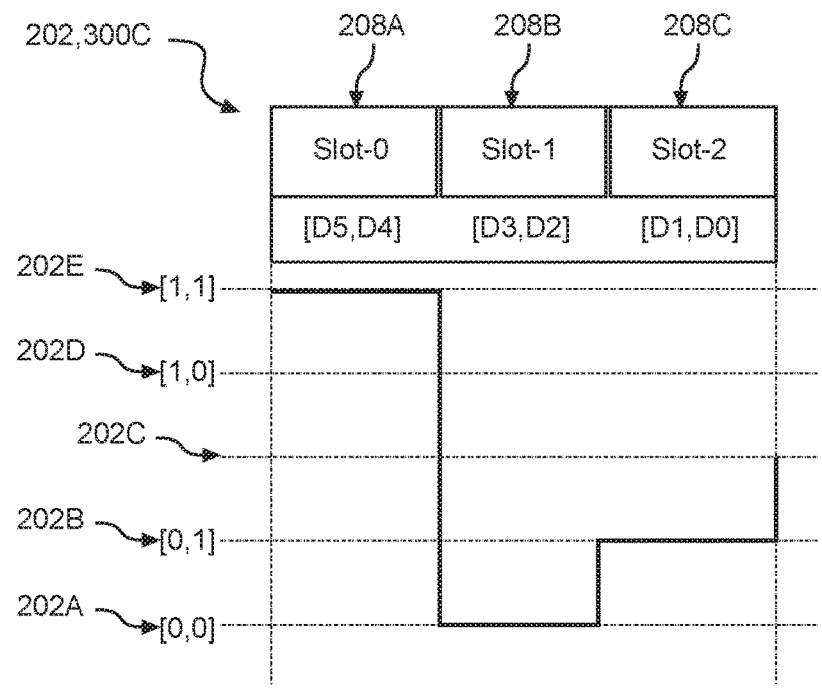
Figure 3D:
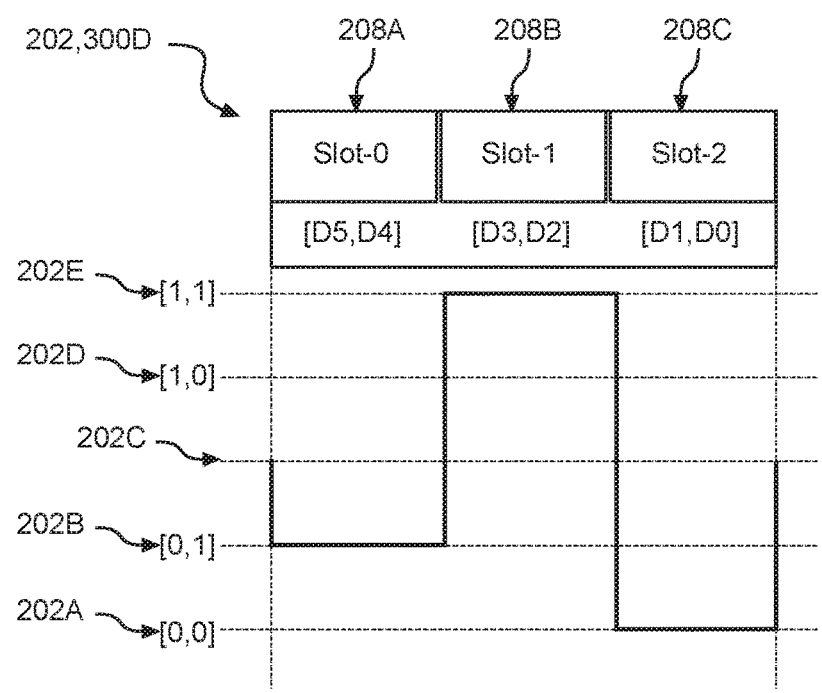

By way of further example, FIGS. 3A-3D illustrate four possible signals with the corresponding encoding. Thus, signal 300A in FIG. 3A is [0,0,0,1,1,0] by having slot 208A at level 202A, slot 208B at level 202B, and slot 208C at level 202D. Similarly, signal 300B in FIG. 3B is [1,0,0,1,1,1] by having slot 208A at level 202D, slot 208B at level 202B, and slot 208C at level 202E. Signal 300C in FIG. 3C is [1,1,0, 0,0,1] by having slot 208A at level 202E, slot 208B at level 202A, and slot 208C at level 202B. Signal 300D in FIG. 3D is [0,1,1,1,0,0] by having slot 208A at level 202B, slot 208B at level 202E, and slot 208C at level 202A. Obviously, other signals may be constructed from the PAM-5 encoding technique, and the examples of FIGS. 3A-3D are not intended to be limiting.

It should be appreciated that many signals on communication buses are eight bits and a parity bit. As evidenced by FIGS. 3A-3D, encoding on just the data line 202 provides six bits, which is three bits too few for the desired nine bits. However, as illustrated in FIG. 2B, the clock line 204 is also available for encoding and opens up another 512 possible states. Not all of these states are needed to form nine bits. Accordingly, a first slot is encoded with a first bit, a third slot is encoded with a second bit, and a duty cycle of the clock line 204 is used as better illustrated in FIGS. 4A-5D. Bits are encoded in the first and third slots 208A and 208C by an amount of displacement (by level) from a center level 204C. Thus, levels 204A and 204E which are two levels from center level 204C are a 1, and levels 204B and 204D, which are only one level from center level 204C are a 0. Other encoding schemes may be used.

Figure 4A:
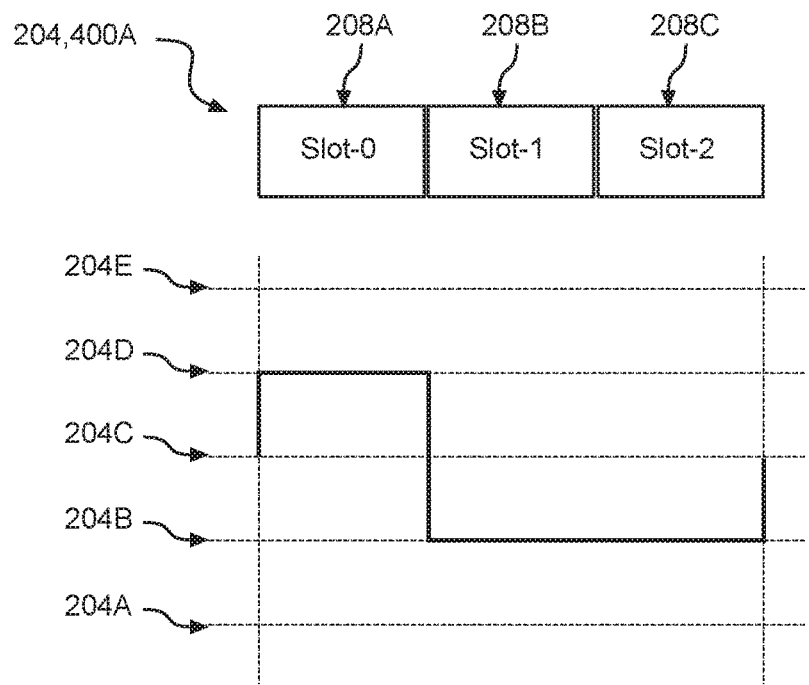
FIGS. 4A-4D illustrate four exemplary encoding possibilities using a PAM-5 encoding scheme to provide two bits and a parity bit on a clock line.
Figure 4B:
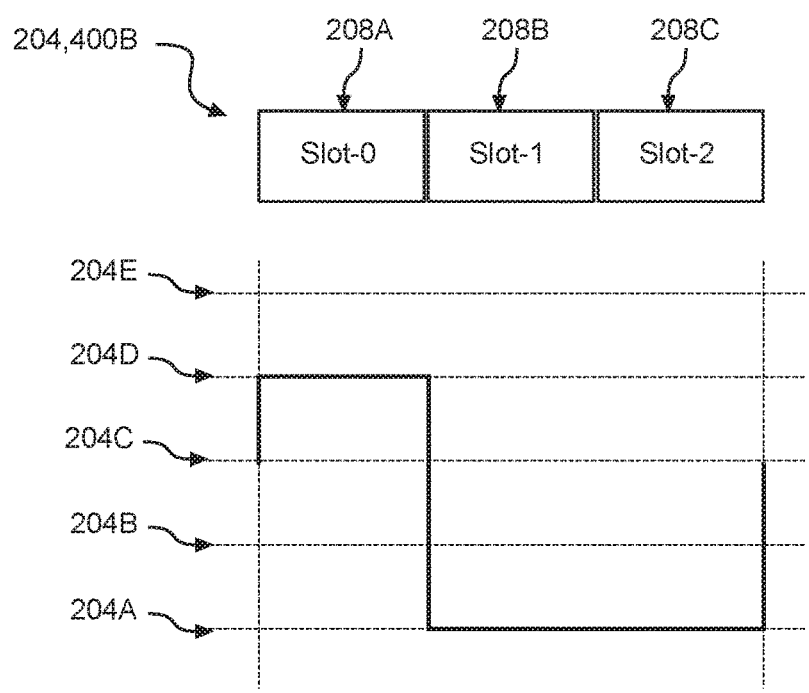
Figure 4C:
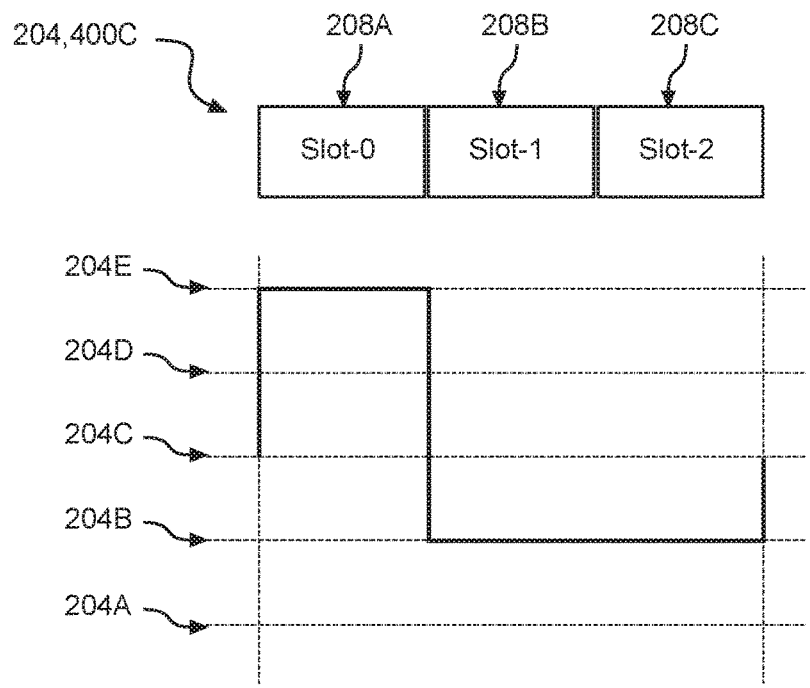
Figure 4D:
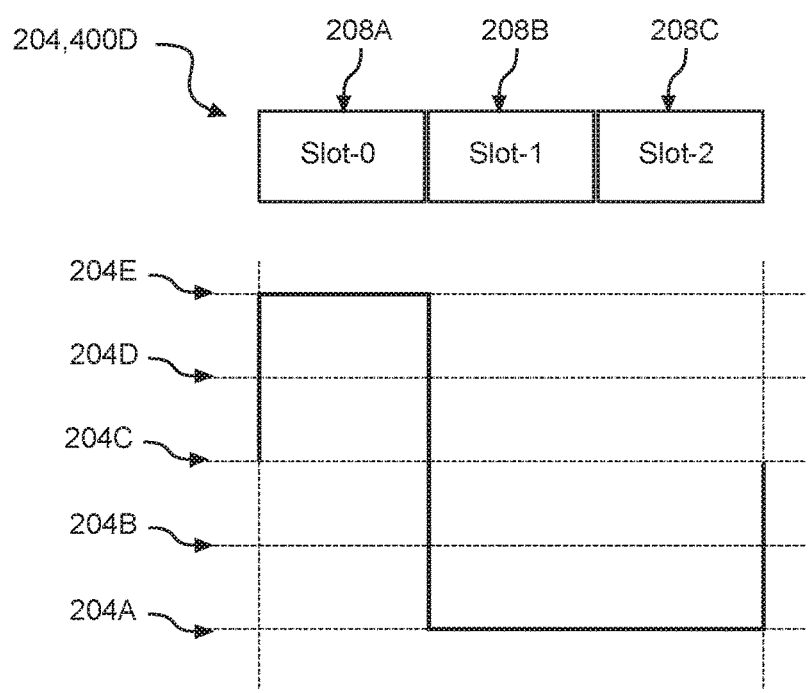

In this regard, FIGS. 4A-4D illustrate signals 400A-400D, respectively, on the clock line 204 where the first slot 208A is encoded with a bit, the third slot 208C is encoded with a bit, and the duty cycle indicates a parity bit. Thus, FIG. 4A has signal 400A where the first slot 208A is set at level 204D (one displacement or 0), the third slot 20C is set at level 204B (one displacement or 0), and has a duty cycle of 33% reflecting an encoding of [0,0] and parity bit [0]. FIG. 4B has signal 400B where the first slot 208A is also set at level 204D, but the third slot 208C is set at 204A (two displacements or 1) and has a duty cycle of 33% reflecting an encoding of [0,1] and parity bit [0]. FIG. 4C has signal 400C where the first slot 208A is set at level 204E (two displacements or 1), the third slot 208C is set at level 204B (one displacement or 0), and has a duty cycle of 33% reflecting an encoding of [1,0] and parity bit [0]. FIG. 4D has signal 400D where the first slot 208A is set at level 204E (two displacements or 1), the third slot 208C is set at level 204A (two displacements or 1), and has a duty cycle of 33% reflecting an encoding of [1,1] and parity bit [0].

Figure 5A:
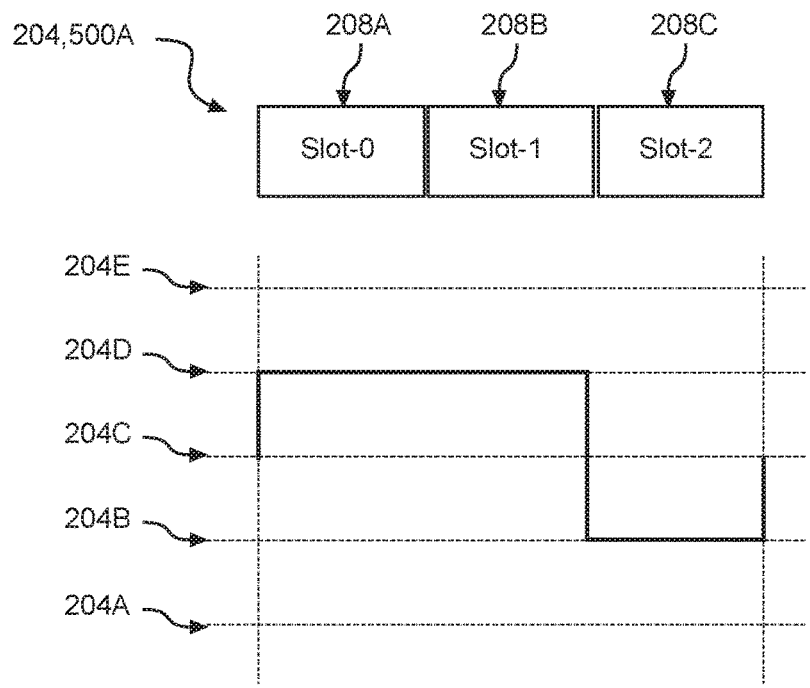
FIGS. 5A-5D illustrate four exemplary encoding possibilities using a PAM-5 encoding scheme to provide two bits and a parity bit on a clock line.
Figure 5B:
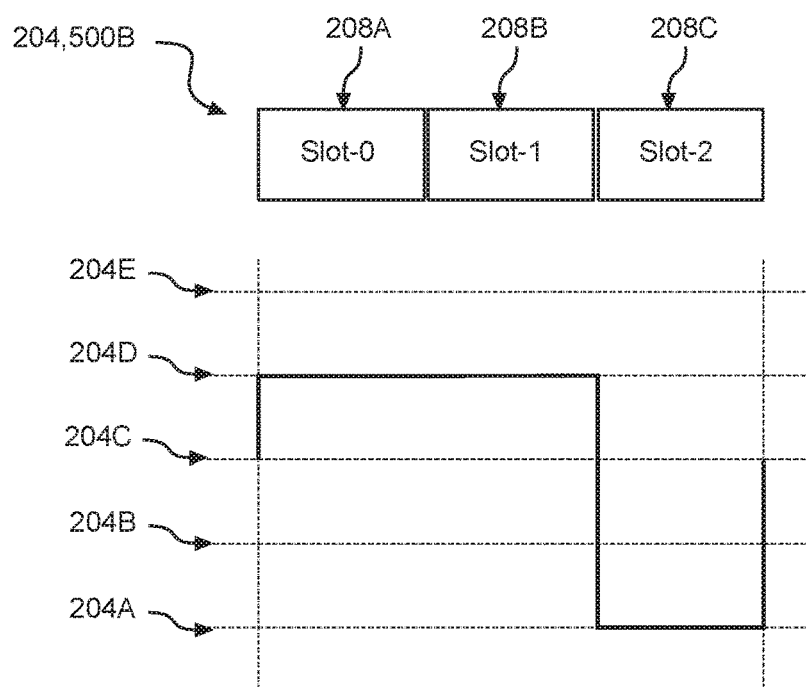
Figure 5C:
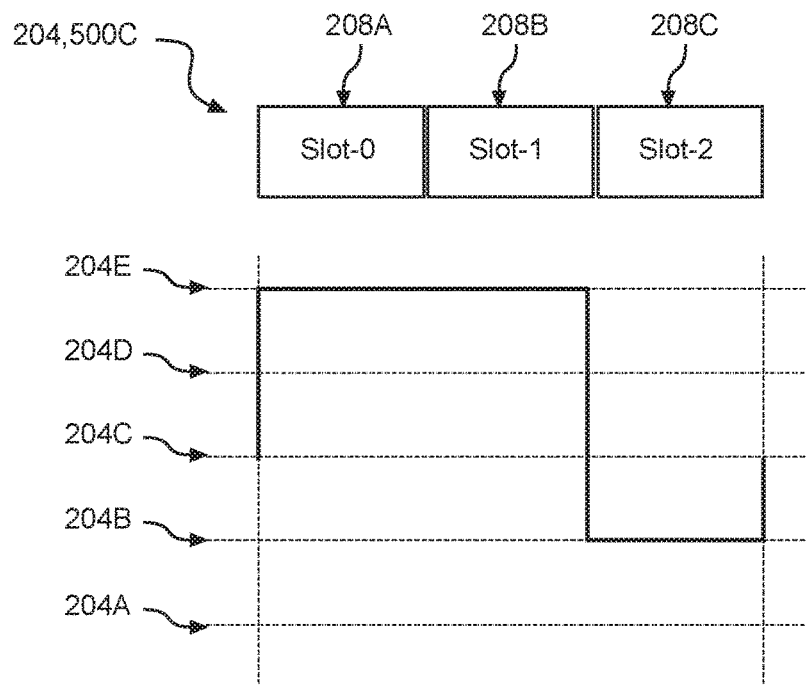
Figure 5D:
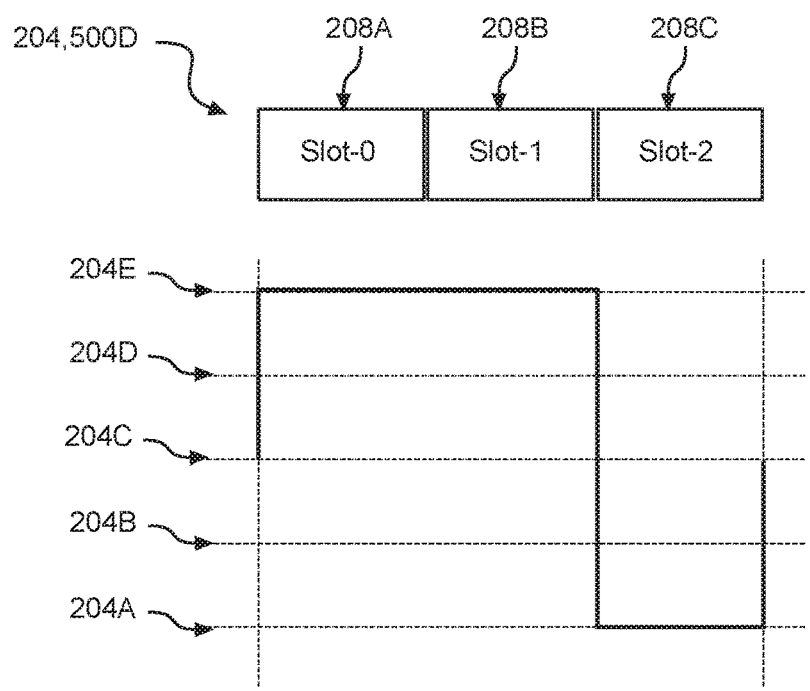

FIGS. 5A-5D illustrate signals 500A-500D, respectively, on the clock line 204 where the first slot 208A is encoded with a first bit, the third slot 208C is encoded with a second bit, and the duty cycle of 66% indicates a parity bit of [1]. Thus, FIG. 5A has signal 500A where the first slot 208A is set at level 204D (one displacement or 0), the third slot 208C is set at level 204B (one displacement or 0), and has a duty cycle of 66% reflecting an encoding of [0,0] and parity bit [1]. FIG. 5B has signal 500B where the first slot 208A is also set at level 204D (one displacement or 0), the third slot 208C is set at level 204A (two displacements or 1), and has a duty cycle of 66% reflecting an encoding of [0,1] and parity bit [1]. FIG. 5C has signal 500C where the first slot 208A is set at level 204E (two displacements or 1), the third slot 208C is set at level 204B (one displacement or 0), and has a duty cycle of 66% reflecting an encoding of [1,0] and parity bit [1]. FIG. 5D has signal 500D where the first slot 208A is set at level 204E (two displacements or 1), the third slot 208C is set at level 204A (two displacements or 1), and has a duty cycle of 66% reflecting an encoding of [1,1] and parity bit [1].

Figure 6A:
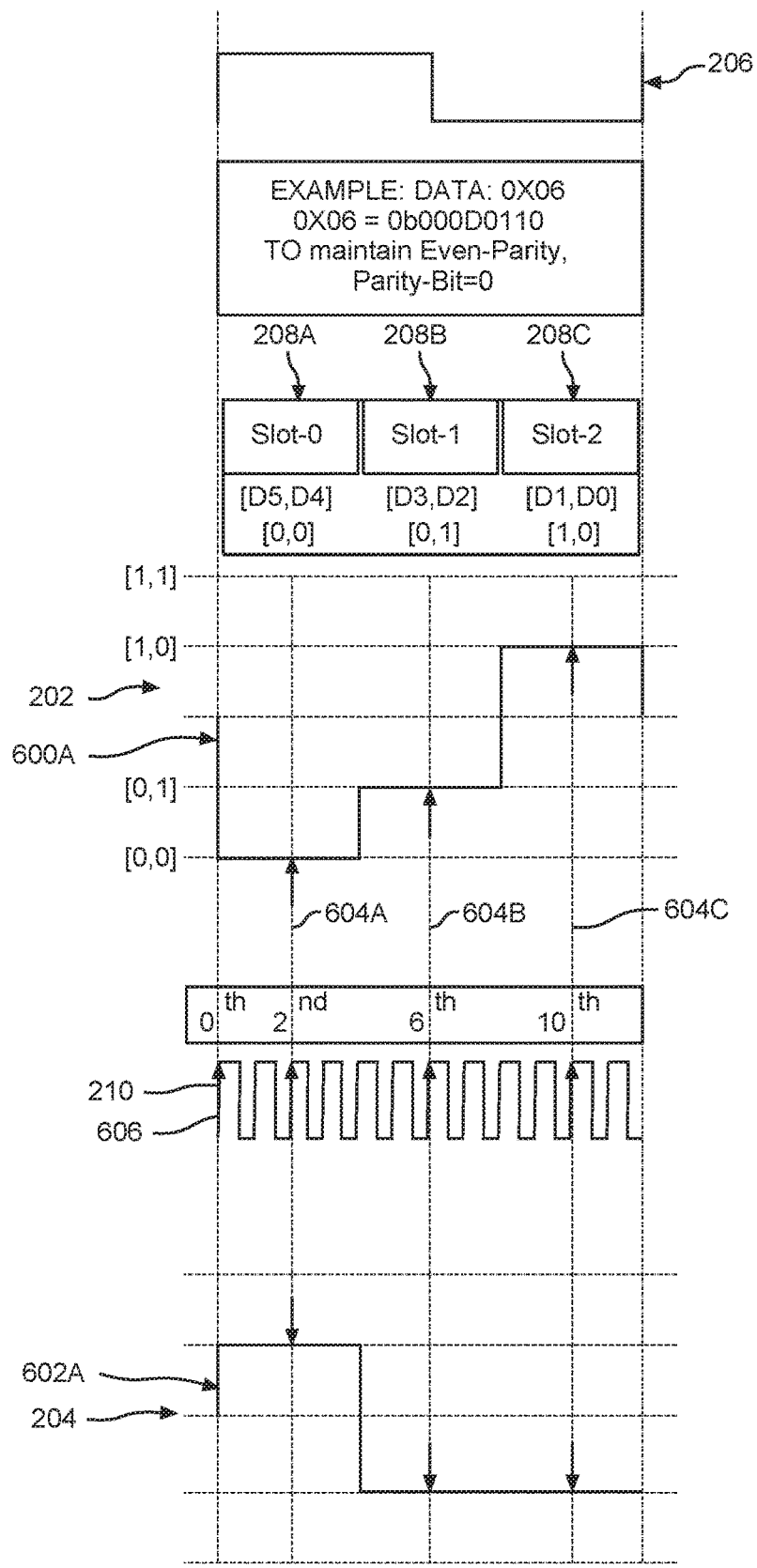
FIGS. 6A and 6B illustrate two encoded signals and sampling thereof.
Figure 6B:
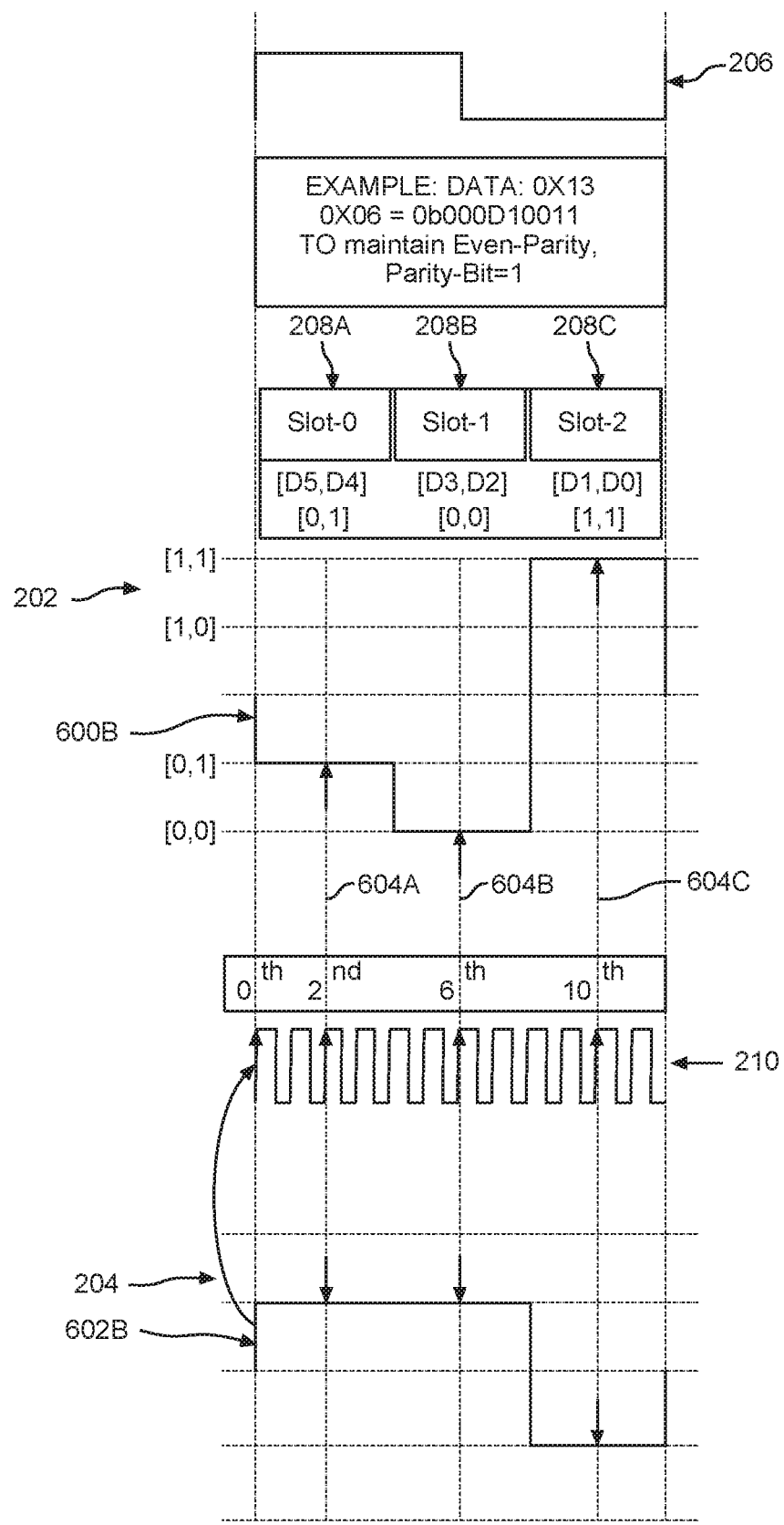

For further illustration, FIGS. 6A and 6B provide examples of encoding and sampling to extract the encoded bits. In particular, FIG. 6A illustrates a data signal 600A on the data line 202 and a clock signal 602A on the clock line 204. The original period 206 is provided for reference. The internal clock signal 210 is used to help set sampling points 604A-604C of both the data signal 600A and the clock signal 602A. By sampling in this manner in each of the slots 208A-208C, the control circuit may ascertain what the level of the signal is and from there determine the bits encoded and the duty cycle of the clock line 204 to derive the parity bit. As illustrated, the data signal 600A encodes [0,0,0,1,1,0] and the clock signal 602A encodes [1,0] and a parity bit [0]. Additionally, the internal clock 210 may be synchronized to the reference clock by an initial rising edge 606. Other phase/polarity options may be covered by implementing programmable options (e.g., an encoded value is 00 or 01 and there is a falling edge at the beginning of a clock cycle).

FIG. 6B is similar, but shows that the data signal 600B encodes [0,1,0,0,1,1] and the clock signal 602B encodes [1,0] and a parity bit [1]. Again, it should be appreciated that these signals are exemplary and other values may be used. Likewise, a different internal clock 210 may dictate a different sampling period, but each slot 208A-208C should have a sample taken.

Figure 7A:
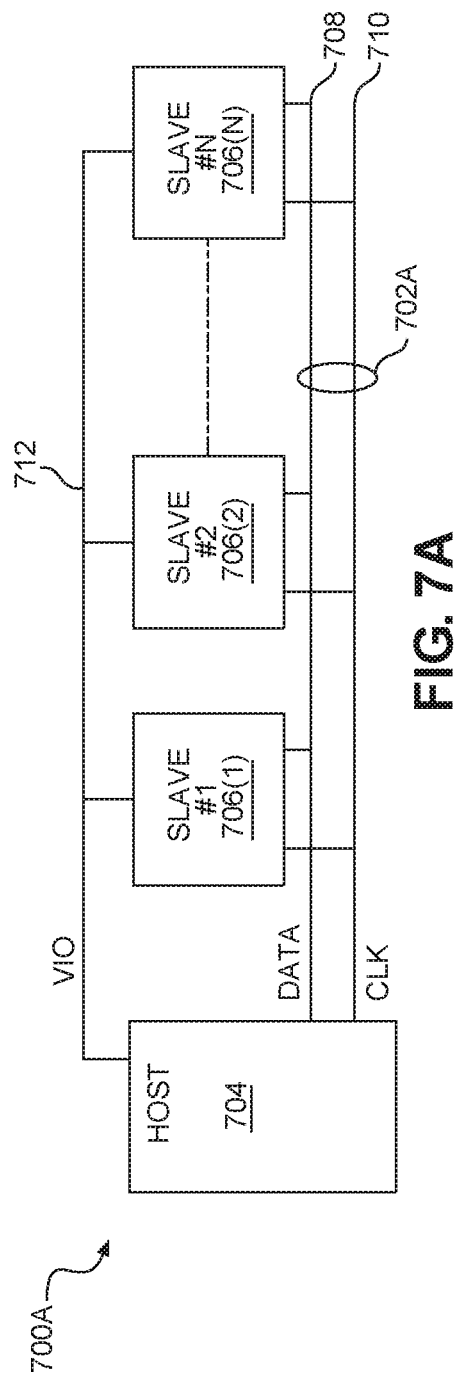
FIG. 7A is a block diagram of a system having a single-ended communication bus.
Figure 7B:
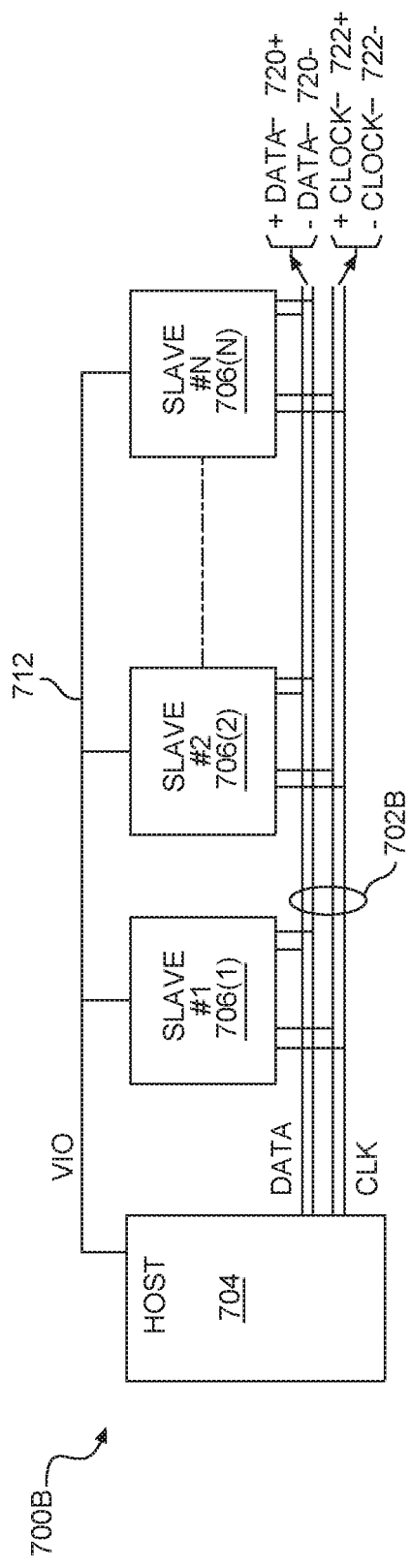
FIG. 7B is a block diagram of a system having a differential communication bus.

FIGS. 7A and 7B provide systems with different types of buses. Specifically, FIG. 7A has a system 700A with a single-ended bus 702A while FIG. 7B has a system 700B with a differential bus 702B. In the system 700A, a master or host 704 couples to the single-ended bus 702A as do slaves 706(1)-706(N). The single-ended bus 702A includes a data line 708 (analogous to the data line 202) and a clock line 710 (analogous to the clock line 204). A voltage line 712 is provided which provides a common voltage reference line for the host 704 and slaves 706(1)-706(N). When determining what levels 202A-202E or 204A-204E are being used, the slaves 706(1)-706(N) may make reference to the voltage level on the voltage line 712. A single-ended bus such as bus 702A may be appropriate when bus frequencies are below one gigahertz (1 GHz).

In the system 700B, a master or host 704 couples to the differential bus 702B as do slaves 706(1)-706(N). The differential bus 702B includes a positive data line 720+ and a negative data line 720− (collectively analogous to the data line 202) and a positive clock line 722+ and a negative clock line 722− (collectively analogous to the clock line 204). A voltage line 712 is provided which provides a common voltage reference line for the host 704 and slaves 706(1)-706(N). When determining what levels 202A-202E or 204A-204E are being used, the slaves 706(1)-706(N) may make reference to the voltage level on the voltage line 712. A differential bus such as bus 702B may be appropriate when bus frequencies are above 1 GHz.

Figure 8A:
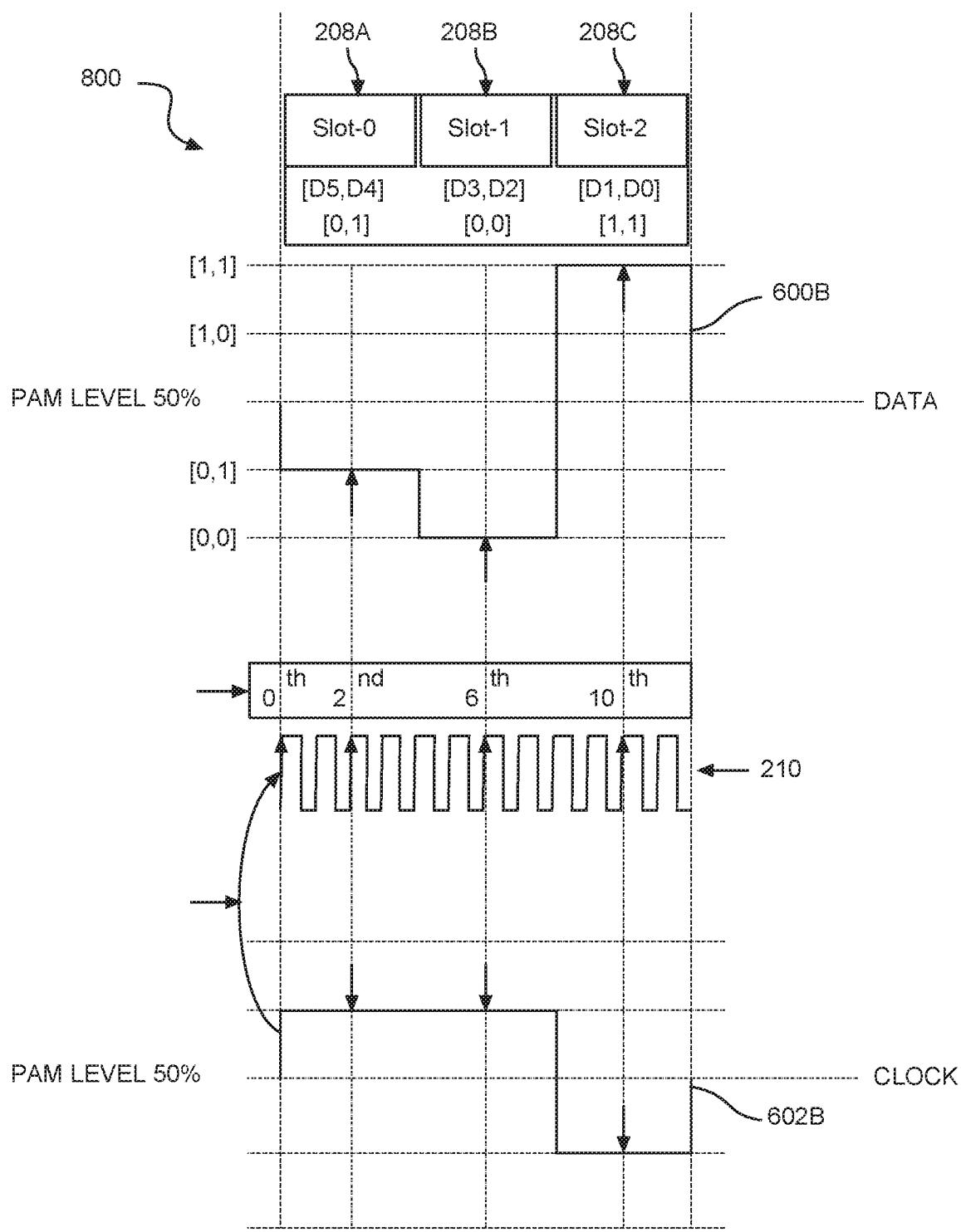
FIGS. 8A and 8B illustrate the difference between single-ended signaling and differential signaling as used by the present disclosure.
Figure 8B:
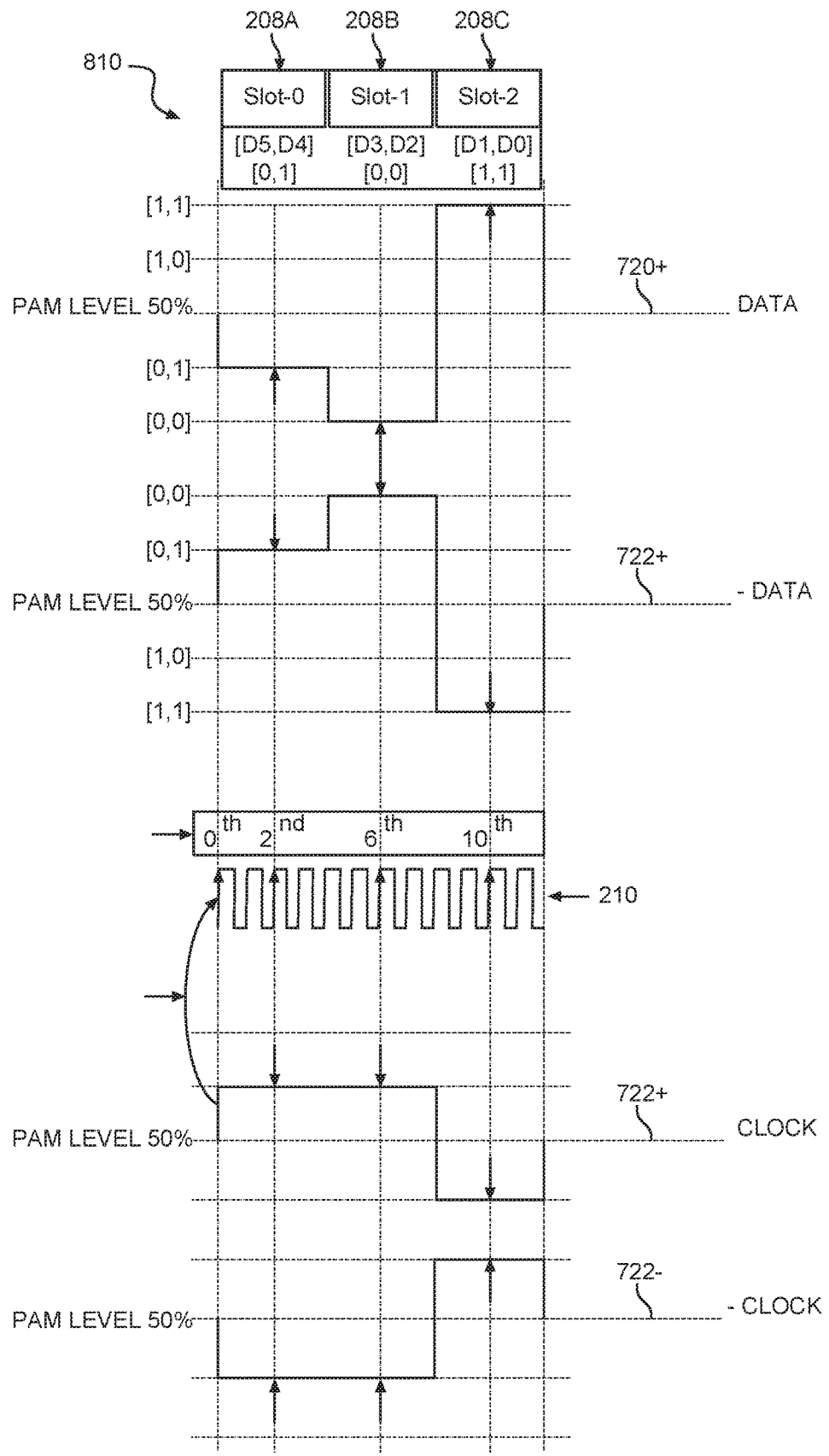

FIGS. 8A and 8B illustrate differences between signals on a single-ended bus and a differential bus. Thus, in FIG. 8A, a single-ended signal 800 is provided substantially identical to the signals 600B and 602B. The same signal as a differential signal 810 in FIG. 8B looks the same on the positive data line 720+ and the positive clock line 722+ but is inverted on the negative data line 720− and the negative clock line 722−.

It should further be appreciated that exemplary aspects of the present disclosure allow easy migration to differential mode operation through negotiation between the host and the slave.

Figure 9:
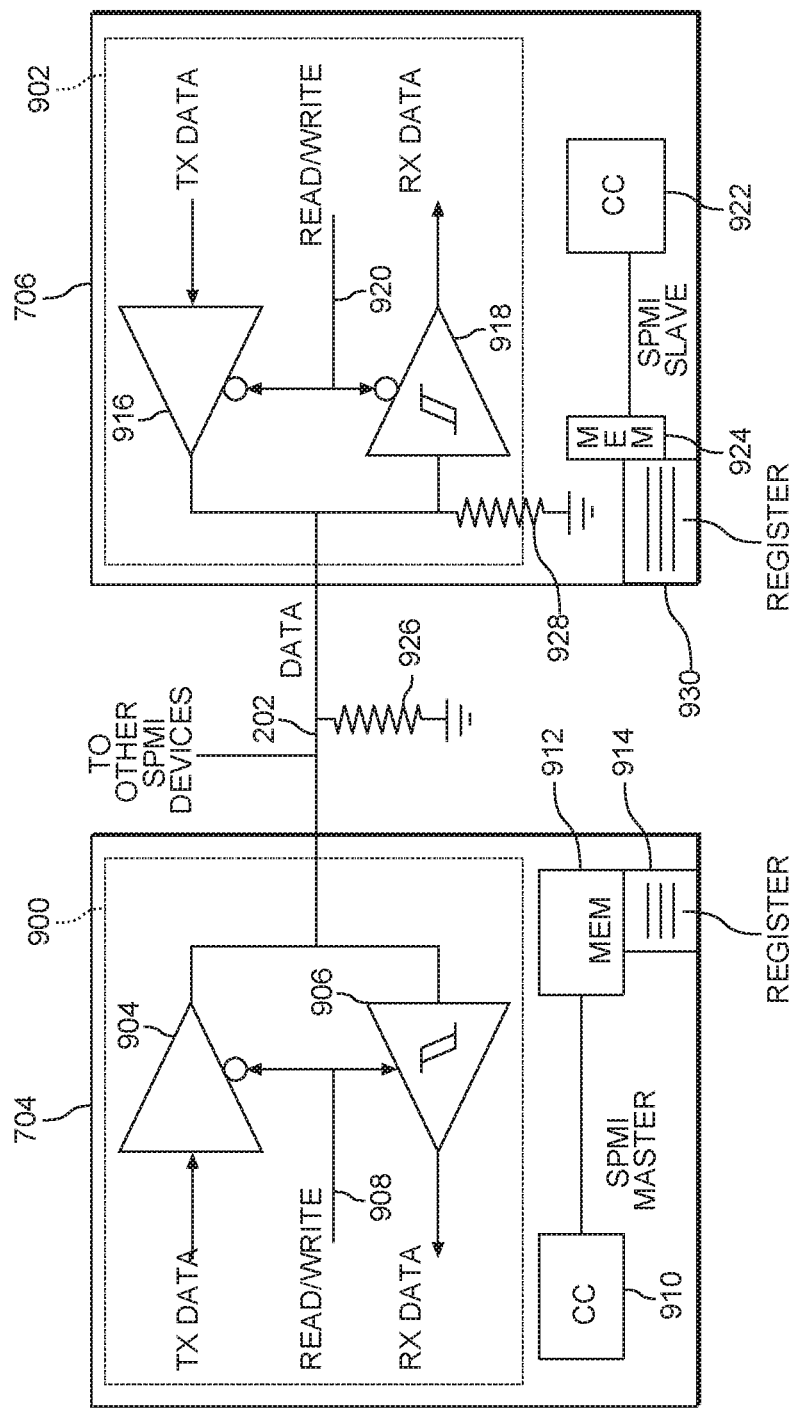
FIG. 9 is a schematic diagram of input/output requirements for a data line of a system power management interface (SPMI) bus for a master and a slave.
Figure 10:
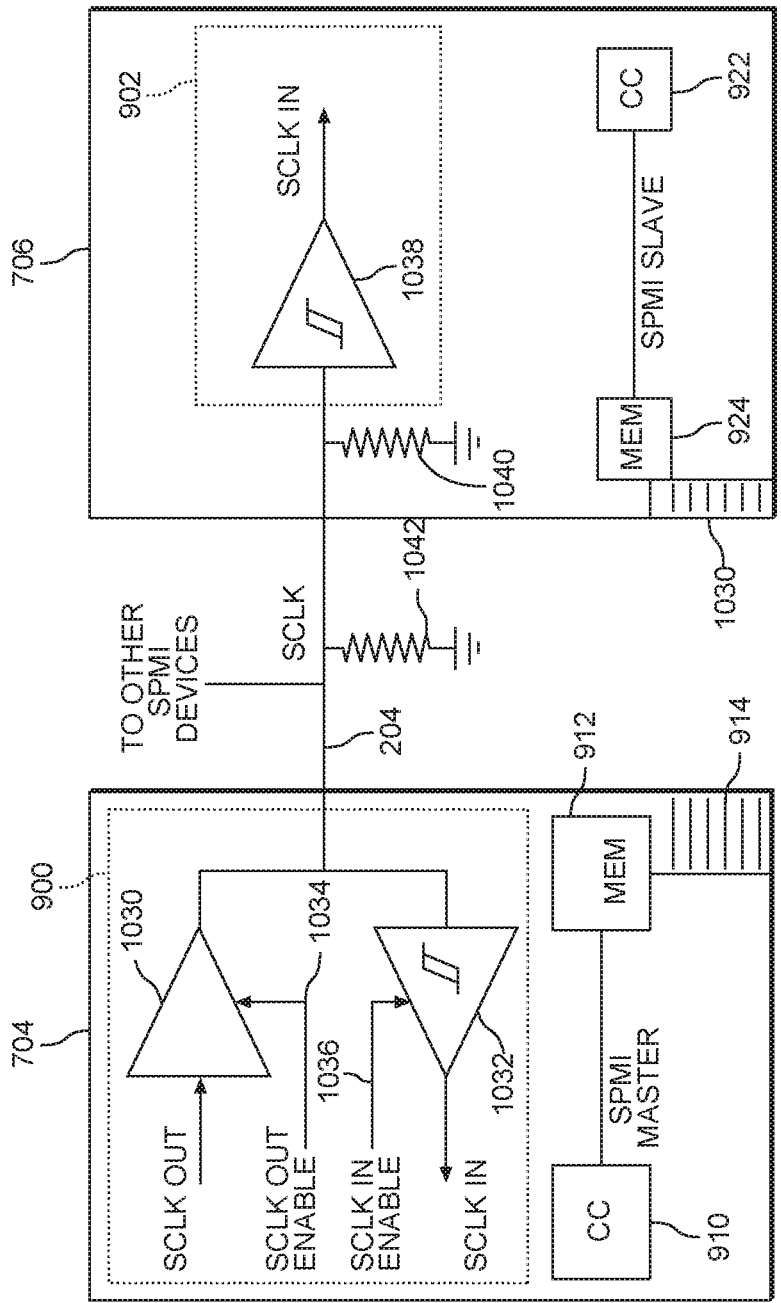
FIG. 10 is a schematic diagram of input/output requirements for a clock line of an SPMI bus for a master and a slave.

To assist in further general understanding of a possible use case, FIGS. 9 and 10 show master and slaves attached to a communication bus, which may be an SPMI bus, an RFFE bus, or the like. While specific hardware is contemplated for a master or slave on an SPMI bus, it should be appreciated that other architectures may be appropriate for RFFE, 13C, or the like and may be used without departing from the present disclosure.

In this regard, FIG. 9 is a schematic diagram of input/output requirements for the data line 202 of a SPMI bus for a master 704 and a slave 706. In particular, a bus interface 900 for the master 704 is illustrated along with a bus interface 902 for the slave 706. The bus interface 900 includes a data out amplifier 904 that sends data on the data line 202 and a data in amplifier 906 that amplifies incoming signals received on the data line 202. The data out/in amplifiers 904, 906 are toggled by a read/write or data in enable signal 908. The master 704 may further include a control circuit 910 (sometimes referred to as CC in the drawings) and a memory element 912 (sometimes referred to as MEM in the drawings) in which registers 914 are stored. The registers 914 may be read from by the slave 706 or written to by the slave 706.

The bus interface 902 includes a data out amplifier 916 that sends data on the data line 202 and a data in amplifier 918 that amplifies incoming signals received on the data line 202. The data out/in amplifiers 916, 918 are toggled by a read/write or data in enable signal 920. The slave 706 may further include a control circuit 922 (sometimes referred to as CC in the drawings) and a memory element 924 (sometimes referred to as MEM in the drawings). Additional pull-down resistors 926 and 928 may be associated with the data line 202 to help provide a logical low when desired. Note that both, one, or neither of the pull-down resistors 926, 928 may be present. The slave 706 may further include registers 930 which the master 704 may write to or read from according to the conventional SPMI protocol.

FIG. 10 is a schematic diagram of input/output requirements for the clock line 204 of the SPMI bus for the master 704 and the slave 706. In particular, the bus interface 900 for the master 704 is illustrated along with the bus interface 902 for the slave 706. The bus interface 900 includes a clock out amplifier 1030 that sends a clock signal from a clock source (not shown) on the clock line 204 and a clock in amplifier 1032 that amplifies incoming signals received on the clock line 204 (including any reflections). The clock out amplifier 1030 is enabled by an SCLK OUT ENABLE signal 1034, while the clock in amplifier 1032 is enabled by an SCLK IN ENABLE signal 1036.

The bus interface 902 includes a clock in amplifier 1038 that amplifies incoming signals received on the clock line 204. Additional pull-down resistors 1040 and 1042 may be associated with the clock line 204 to help provide a logical low when desired. Note that both, one, or neither of the pull-down resistors 1040, 1042 may be present. The slave 706 may have an internal clock source, which may be a phase-locked loop (PLL) (not shown), a crystal oscillator, or the slave 706 may derive a clock signal from the signal on the clock line 204, in which case a PLL may be used to provide a sampling frequency. The slave 706 may synchronize with the master 704 at the initial rising edge of the clock signal.

Figure 11:
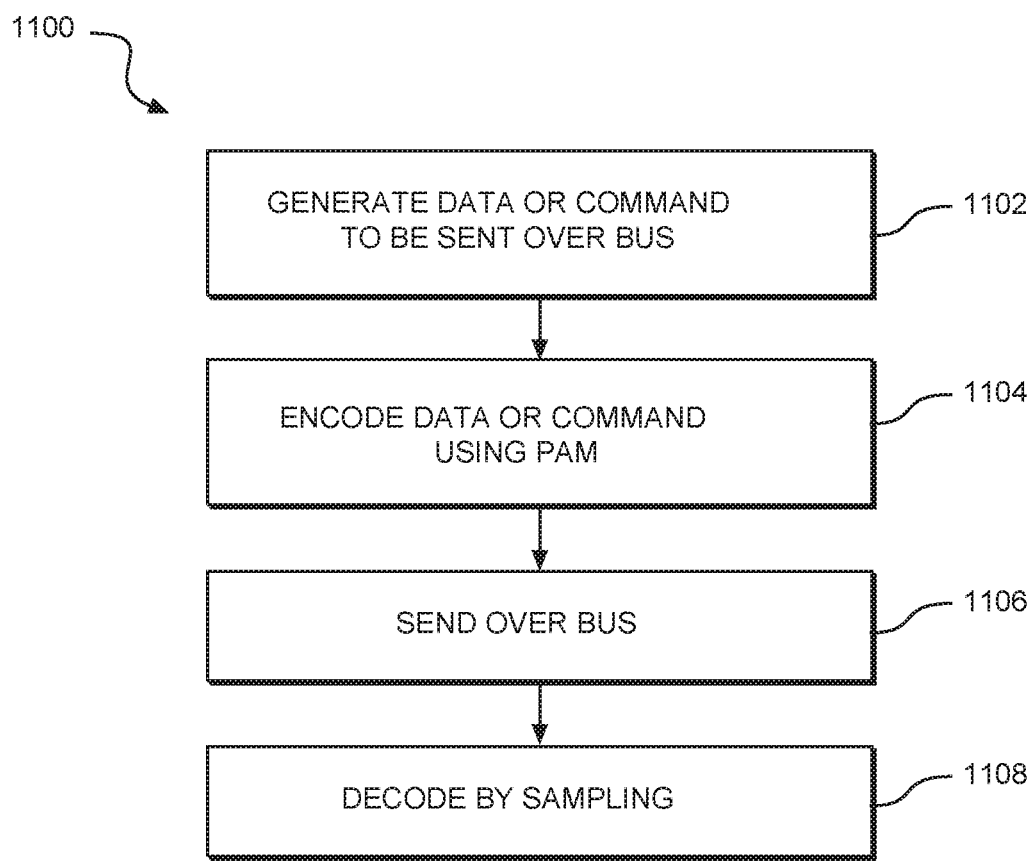
FIG. 11 is a flowchart illustrating an exemplary process for using PAM encoding to increase bandwidth on a communication bus.

A brief overview of a process 1100 of using PAM encoding is provided with reference to FIG. 11. Specifically, the process 1100 begins when a host 704 or a slave 706 generates data or a command to be sent over a bus (block 1102). The data or command is encoded using a PAM encoding technique (block 1104) and sent over the bus (block 1106). The recipient decodes the signal by sampling (block 1108).

The PAM encoding for a communication bus according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The devices described herein may be employed in any circuit, hardware component, IC, or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. An integrated circuit (IC) comprising:
   a bus interface coupled to a communication bus;
   a clock source coupled to the bus interface; and
   a control circuit configured to:
   send a clock signal derived from the clock source and having a parity bit embedded therein over a clock line of the communication bus through the bus interface;
   send a pulse amplitude modulated (PAM) data signal over a data line of the communication bus; and
   sample the data line for incoming signals at a rate at least three times a frequency of the clock signal.

2. The IC of claim 1, wherein the control circuit is configured to provide eight bits of data and the parity bit across a single clock cycle of the clock source.

3. The IC of claim 1, wherein the bus interface is configured to be coupled to one of a radio frequency front end (RFFE) bus, a system power management interface (SPMI) bus, or an I3C bus.

4. The IC of claim 2, wherein the PAM data signal comprises six bits of data per clock cycle.

5. The IC of claim 4, wherein the clock signal comprises two bits of data in addition to the parity bit.

6. The IC of claim 1, wherein the control circuit is configured to encode the PAM data signal using a three-level PAM (PAM-3) encoding technique.

7. The IC of claim 1, wherein the control circuit is configured to encode the parity bit into the clock signal by setting a duty cycle of the clock signal.

8. The IC of claim 1, wherein the bus interface comprises a single-ended bus interface.

9. The IC of claim 1, wherein the bus interface comprises a differential bus interface.

10. The IC of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

11. An integrated circuit (IC) comprising:
    a bus interface coupled to a communication bus;
    a control circuit configured to:
    receive a clock signal having a parity bit embedded therein over a clock line of the communication bus through the bus interface; and
    receive a pulse amplitude modulated (PAM) data signal over a data line of the communication bus; and
    a clock source operating with at least three times a frequency of the clock signal.

12. The IC of claim 11, wherein the control circuit is further configured to sample the PAM data signal using the clock source at least three times during a period of the clock signal.

13. The IC of claim 11, wherein the bus interface comprises a system power management interface (SPMI) bus interface, a radio frequency front end (RFFE) bus interface, or an I3C bus interface.

14. The IC of claim 11, wherein the control circuit is configured to receive a five-level PAM (PAM-5) encoded data signal over the data line.

15. The IC of claim 11, wherein the control circuit is configured to receive a three-level PAM (PAM-3) encoded data signal over the data line.

16. The IC of claim 11, wherein the control circuit is configured to decode six bits from the PAM data signal.

17. The IC of claim 11, wherein the control circuit is configured to decode two bits and the parity bit from the clock signal.

18. The IC of claim 11, wherein the clock source comprises a phase-locked loop (PLL).

19. The IC of claim 11 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

20. A computing system comprising:
    a communication bus;
    a first integrated circuit (IC) comprising:
    a first bus interface coupled to the communication bus;
    a clock source coupled to the first bus interface; and
    a first control circuit configured to:
    send a clock signal derived from the clock source and having a parity bit embedded therein over a clock line of the communication bus through the first bus interface; and
    send a pulse amplitude modulated (PAM) data signal over a data line of the communication bus; and
    a second IC comprising:
    a second bus interface coupled to the communication bus; and
    a second control circuit configured to:
    receive the clock signal having the parity bit embedded therein; and
    receive the PAM data signal.

21. The computing system of claim 20, wherein the second IC comprises a second clock source operating at a frequency at least three times a frequency of the clock signal.

22. The computing system of claim 20, wherein the first control circuit is further configured to allow programmable selection of clock-to-data phase and polarity relationships.

\* \* \* \* \*